(12) United States Patent
Caserta

(10) Patent No.: US 11,481,133 B2
(45) Date of Patent: Oct. 25, 2022

(54) METHOD OF MANAGING INTEGRATED CIRCUITS CARDS BY WIDENING THE BIGGEST EMPTY REGION, CORRESPONDING CARD AND APPARATUS

(71) Applicant: STMicroelectronics S.r.l., Agrate Brianza (IT)

(72) Inventor: Francesco Caserta, Naples (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 709 days.

(21) Appl. No.: 16/248,538

(22) Filed: Jan. 15, 2019

(65) Prior Publication Data

US 2019/0250842 A1 Aug. 15, 2019

(30) Foreign Application Priority Data

Feb. 13, 2018 (IT) .......................... 102018000002644

(51) Int. Cl.
  *G06F 12/00* (2006.01)
  *G06F 3/06* (2006.01)
  *H04W 8/18* (2009.01)
  *G06F 12/02* (2006.01)

(52) U.S. Cl.
  CPC .......... *G06F 3/0644* (2013.01); *G06F 3/0604* (2013.01); *G06F 3/0608* (2013.01); *G06F 3/0652* (2013.01); *G06F 3/0679* (2013.01); *G06F 12/023* (2013.01); *G06F 12/0238* (2013.01); *G06F 12/0246* (2013.01); *H04W 8/183* (2013.01); *G06F 2212/7205* (2013.01)

(58) Field of Classification Search
  CPC .... G06F 3/0644; G06F 3/0604; G06F 3/0608; G06F 3/0652; G06F 12/023; G06F 12/0238; G06F 12/0246; G06F 2212/7205
  See application file for complete search history.

(56) References Cited

U.S. PATENT DOCUMENTS

| 5,604,902 A | * | 2/1997 | Burkes ................. G06F 3/0601 |
| 2007/0011415 A1 | * | 1/2007 | Kaakani .............. G06F 12/0269 |
| | | | 711/159 |
| 2015/0186279 A1 | | 7/2015 | Dong et al. |

FOREIGN PATENT DOCUMENTS

| EP | 1046996 A1 | 10/2000 |
| EP | 2275915 A1 | 1/2011 |
| EP | 2804368 A1 | 11/2014 |

* cited by examiner

*Primary Examiner* — Reginald G Bragdon
*Assistant Examiner* — Michael L Westbrook
(74) *Attorney, Agent, or Firm* — Slater Matsil, LLP

(57) ABSTRACT

A method of managing an integrated circuit memory includes having an integrated circuit card with a memory space including memory space regions for storing user profile data. The memory space is partitioned into segments of memory space regions, where the segments of memory space regions includes allocated regions and empty regions. From the empty regions, the biggest empty region of the memory space is selected. The selected biggest empty region is widened by moving memory blocks positioned in a subset of allocated regions that are at boundaries of the selected biggest empty region into other available empty regions.

26 Claims, 12 Drawing Sheets

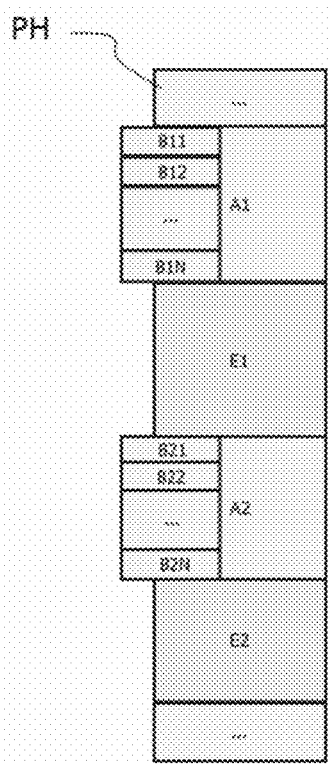
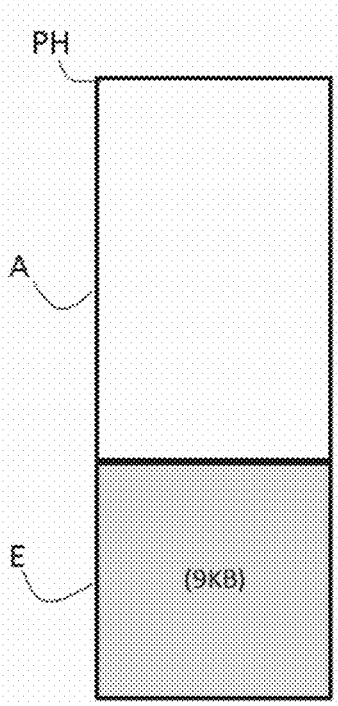
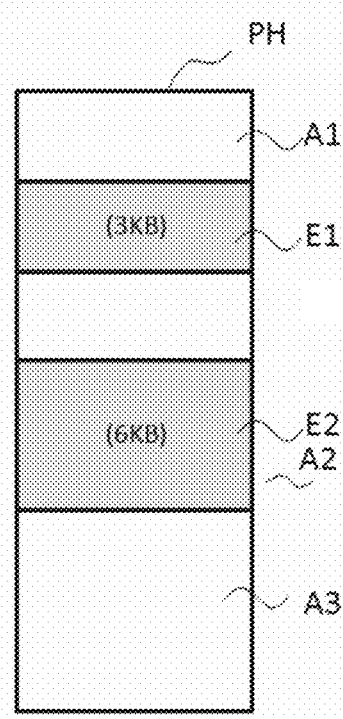
Fig. 3
(PRIOR ART)
Fig. 4A
(PRIOR ART)
Fig. 4B
(PRIOR ART)

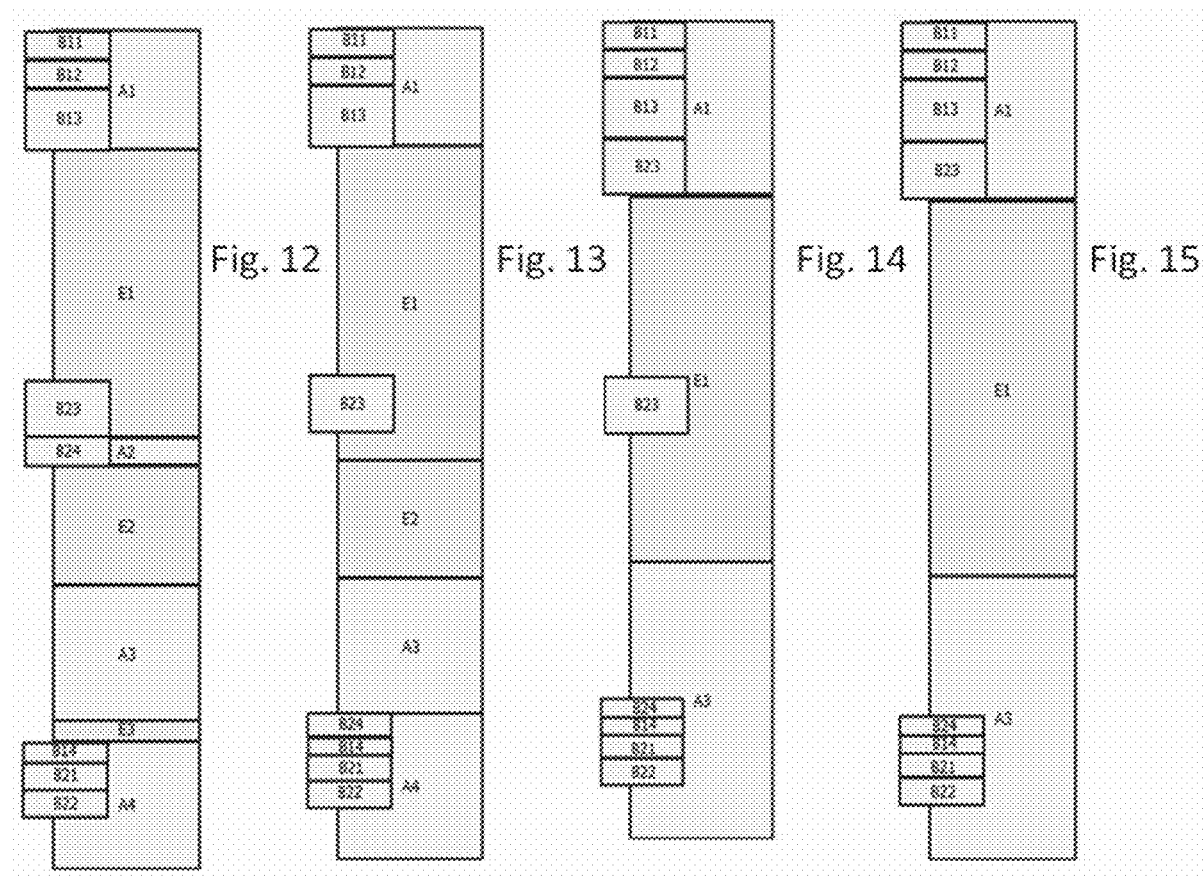

METHOD OF MANAGING INTEGRATED CIRCUITS CARDS BY WIDENING THE BIGGEST EMPTY REGION, CORRESPONDING CARD AND APPARATUS

CROSS-REFERENCE TO RELATED APPLICATIONS

This application claims priority to Italian Patent Application No. 102018000002644, filed on Feb. 13, 2018, which application is hereby incorporated herein by reference.

TECHNICAL FIELD

The present application relates to semiconductor circuits, and in particular to integrated circuit cards.

BACKGROUND

Mobile communication equipment in e.g. GSM and UMTS networks may employ smart cards of the type currently referred to as Universal Integrated Circuit Card (UICC).

Mobile communication equipment in e.g. GSM and UMTS networks may employ smart cards of the type currently referred to as Universal Integrated Circuit Card (UICC).

To this regard, FIG. 1 shows a possible architecture of a "user equipment" 10, such as a mobile device, e.g. a smartphone or a tablet, or a mobile communication module usually to be used in embedded systems. Generally, the device 10 comprises one or more processors 102 connected to one or more memories 104. The device 10 comprises moreover at least one mobile communication interface 106 for communication with a base station BS. For example, the mobile communication interface 106 may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver. A mobile device comprises often also a user interface 110, such as a touchscreen. Conversely, a communication module to be used, e.g., in embedded systems, such as alarm systems, gas meters or other types of remote monitoring and/or control systems, often does not comprise a user interface 110, but a communication interface 112 in order to exchange data with a further processing unit of an embedded system. For example, in this case, the interface 112 may be a digital communication interface, such as a UART (Universal Asynchronous Receiver-Transmitter), SPI (Serial Peripheral Interface) and/or USB (Universal Serial Bus) communication interface. Generally, the processor 102 may also be directly the main processor of an embedded system. In this case the interface 112 may be used to exchange data with one or more sensors and/or actuators. For example, in this case, the interface 112 may be implemented by means of one or more analog interfaces and/or digital input/output ports of the processor 102.

In the memory 104 may be stored e.g. an operating system OS being executed by the processor 102 and which manages the general functions of the device 10, such as the management of the user interface 110 and/or the communication interface 112 and the establishment of a connection to the base station BS via the mobile communication interface 106. The memory 104 may also contain applications being executed by the operating system OS. For example, in the case of a mobile device, the memory 104 often comprises a web browser application WB.

For establishing a connection with the base station BS, the device 10 is coupled to a SIM card 108 configured to manage the identity identification of the user. For example, usually a mobile device comprises a card holder for receiving a card comprising a Subscriber Identity Module (SIM), which is usually called SIM card. Generally a corresponding SIM module may also be installed directly within the device 10. A SIM card 108 such as UICC is used in the example of FIG. 1, which is a smart card often used in GSM and UMTS networks. The SIM card 108 ensures the integrity and security of all kinds of personal data and typically holds a few hundred kilobytes. Also a UICC may be integrated directly in the device 10 and is in this case often called embedded UICC (eUICC).

For example, in a GSM network, the SIM card 108 contains a SIM application, and in a UMTS network, the SIM card 108 contains a USIM application. A UICC may contain several applications, making it possible for the same smart card to give access to both GSM and UMTS networks, and may also provide storage of a phone book and other applications.

Accordingly, the reference to a SIM module in the following of the present description is intended to include both 2G and/or 3G SIM modules and applies also the case in which such a SIM module is provided on a SIM card.

As shown in FIG. 2, a SIM card 108 often comprises one or more processors 1082 and one or more memories 1084 for executing applications stored in the memory 1084 of the module 108. For example, the SIM card 108 may comprise in addition to the Subscriber Identity Module application (reference sign SIM in FIG. 2) at least one further application APP. For example, this application APP may be configured to communicate (directly, or indirectly via the processor 102 and possibly the operating system OS) with the mobile communication interface 106 in order to send data to and/or receive data from a remote host 30. For this purpose, the host 30 may be connected via a network 20, such as a Local Area Network (LAN) or a Wide Area Network (WAN), such as the internet, to the base station BS. Accordingly, connection between the host 30 and the SIM card 108 may be established by means of the network 20, the base station BS and the communication interface 108. Generally, the communication may be initiated by the host 30 or the SIM card 108. For example, the application APP may be a web server application, which receives requests from the web browser WB of a mobile device 10 and obtains respective content from a remote host 30, such as a web server. The application APP may also be an authentication application. In this case, the host 30 may send an authentication request to the SIM card 108 and the SIM card 108 may send an authentication response to the host 30.

As shown, a UICC may use a SIM application to access the GSM network and a USIM application to access a UMTS network. A UICC may contain several applications, making it possible for a same smart card to give access to several networks by also providing facilities to the users.

An operator may specify a set of applets, security domains and files that the smart card issuer stores in the smart card. This set of information is currently referred to as "profile".

A recent development of UICC cards is represented by embedded UICC (eUICC) which may be incorporated e.g. in a mobile terminal, thus enabling a user to change operator (and so its profile) over the air by means of a software procedure. An eUICC is also capable of managing multiple mobile network operator subscriptions, by making it possible for a user to enable/disable a current profile on the fly.

UICC cards and eUICC cards may reside in a non-volatile memory (e.g. flash-based) used to store a profile.

As discussed previously, a profile may include a hierarchy of security domains that is specific applications which can be regarded as authentication entities (key containers) by means of which an operator can modify a profile over the air. A set of packages that is a set of related classes and interfaces usually written by means of the Java Card language. A set of applets that is applications capable of authenticating to a specific network (e.g. UMTS) or interact with the user; these applets may be written by means of a Java Card technology and may include many Java Card objects. The profile also includes a hierarchy of directories and files, which contain personalization information for the applets as well as data useful for authentication purposes.

Profile entities such as security domains, packages, applets, files may include a set of objects to be stored and handled by the operating system of the related apparatus.

Security domains and applets may include Java Card objects and code. These and other type of persistent entities (such as files and directories), are indivisible (in a UICC without memory management unit) and stored in memory. They can be, without prejudice to the underlying principles, called "blocks".

Each block stored in a non-volatile memory in an UICC may pertain to a single profile installed in the card. In a multi-profile UICC, the operating system will keep a correspondence between each block and its associated profile.

For instance, security domains, applets and files loaded on the card can be deleted or modified by the operator over the air. Files can also be resized. Objects pertaining to a security domain (e.g. a set of keys) can be deleted. In eUICC even an entire profile can be deleted over the air. This can possibly generate several holes, i.e. memory sections not written with data, depending on the allocation policy of the operating system, in the non-volatile memory.

Every time a hole is generated, the so called "fragmentation" of the non-volatile memory increases. A fragmented memory may cause problems when allocating large blocks. For instance, if the total available memory has a first size in bytes, but the largest hole available has a second size in bytes, of course smaller than the first size, the maximum size of an allocable block corresponds this second size. It would be desirable to have the largest size for the allocable block.

In the following detailed description various technical terms will be used to which the following definitions apply.

Persistent heap: this is a part of persistent memory of the card which is used by the card itself to store applications, packages, security domains and files pertaining to the different profiles, and may include a list of empty and allocated regions.

Block: this is an indivisible amount of stored data that contains a Java Card object or a file. Given a block reference B, that is an identifier of the block, the operating system of apparatus such as UE may determine its address B.addr and size B.size. For example, the operating system may hold a data structure called allocation block table that keeps a correspondence between block references and their address/size.

Allocated region: this is a memory area where a set of adjacent blocks are allocated. Given an allocated region A, the operating system is able to determine its size A.size, for example as the sum of the sizes of the blocks included in the region.

Empty region: this is a memory area which is free, that is a memory area where no blocks B are allocated (even partially). Given an empty region E, the operating system is able to determine its address E.addr and its size E.size, in order to keep trace of the available space. The operating system can, for instance, maintain a list of empty regions.

In the following it will be assumed that an allocated region is always preceded by an empty region or the beginning of the heap while also assuming that it is followed by an empty region or the end of the heap.

Vice versa, an empty region will be preceded by an allocated region or the beginning of the heap and will be followed by an allocated region or the end of the heap.

E1 may be the empty region, which can be a lower region, indicated here as E1L, or an upper region E1U adjacent to an allocated region A1, and E2 may be the empty region adjacent to a set of blocks S in the allocated region A2. Moving the set S of size S.size from the allocated region A2 and appending (or prepending) them to another allocated region A1, means moving the set of blocks at the beginning (the end) of the lower (upper) adjacent empty region E1L (E1U). In this operation, the size E1L.size (E1U.size) of the adjacent empty region E1L (E1U), decreases of the set size S.size, allocated region A1 size A1.size increases of S.size, A2.size decreases of S.size and E2 size increases of S.size.

Therefore, by way of example, with reference to FIG. 3, a persistent heap PH in the persistent memory 1084 can be generalized as a series of allocated regions A1, A2, . . . and empty regions E1, E2, . . . . Each allocated region is composed of a set of blocks. With reference to FIG. 3, A1 and A2 are allocated regions, E1 and E2 empty regions, B11 . . . B1N blocks in the allocated region A1, B21 . . . B2N blocks in the allocated region A2. In FIG. 3, for simplicity, empty region E1 is indicated as such, not specifying if it is an upper region E1L, thus its size is simply E1.size.

An exemplification of this is given in FIGS. 4A and 4B, where a persistent heap of a storage memory 1084 of a smart card such as SIM card 108 is illustrated in two scenarios. In FIG. 4A, the storage memory 1084 has an allocated memory region A having a given size, for instance 9 KB, and an empty memory region E not written with data, having the same size. In FIG. 4B the total amount of empty memory is the same, however there are three allocated memory regions A1, A2, A3, such that two empty memory regions E1, having a size of 3 KB, and E2 having a size of 6 KB are available, i.e. the maximum block size allocable is 6 KB, while in the scenario of FIG. 1A a block with size 9 KB can be stored.

In general the smart card may include a MCU (Microcontroller Unit), corresponding for instance to the one or more processors 1082. In case the MCU of the smart card supports a Memory Management Unit (MMU) blocks can be divisible. Fragmentation is not a relevant problem in this kind of MCU. However it is very uncommon to have an MMU installed on a smart card MCU. Some software libraries can simulate an MMU. However their use is pretty invasive, and they slow down memory accesses.

A simple known solution to the fragmentation problem, defined here is classic defragmentation that includes swapping all the allocated regions with their upper empty region, starting from the second allocated region. For example, in FIG. 4B, the first allocated region from the upper bound of the persistent heap, i.e. A1, is not swapped, the next one A2 is swapped with E1. In this way all the empty regions would be compacted down, and eventually a single empty region is obtained. Using this approach, the number of non-volatile writes, or write operations, would be the sum of the sizes of the allocated regions A1, A2 . . . , starting from the second one. This sum can be very large if there are big allocated partitions and/or a lot of small empty partitions (holes). In fact each time the size of an empty partition E1, E2 . . . is less than the size of a Flash Page, the latter and the adjacent allocated region need to be swapped transactionally. This more than doubles the necessary memory operations. FIGS. 5A, 5B and 5C shows the procedure swapping all the allocated regions with their upper empty region, starting from the second allocated region. In the initial step (FIG. 5A) there are three allocated regions A1, A2, A3, separated by three empty regions E1, E2, E3. After a first swap in FIG. 5B, a second swap is performed in FIG. 2C obtaining a sum size which is in the best case A2+A3.

However, in the real world, smart card suppliers choose UICC prices based also on the memory size destined to the operator. The operator is likely to choose the smallest memory size possible. The non-volatile memory is likely to be almost all allocated, and so empty regions very small. For this reason this solution usually leads to large executions times.

SUMMARY

In one embodiment, a method of managing an integrated circuit memory includes having an integrated circuit card with a memory space including memory space regions for storing user profile data. The memory space is partitioned into segments of memory space regions, where the segments of memory space regions includes allocated regions and empty regions. From the empty regions, the biggest empty region of the memory space is selected. The selected biggest empty region is widened by moving memory blocks positioned in a subset of allocated regions that are at boundaries of the selected biggest empty region into other available empty regions.

In another embodiment, an integrated circuit card includes a processor, a program to be executed in the processor stored in a memory, and a memory space comprising memory space regions for storing user profile data. The program comprises instructions for partitioning the memory space into segments of memory space regions. The segments of memory space regions comprise allocated regions and empty regions. The program further comprises instructions for selecting, from the empty regions, the biggest empty region of the memory space; and widening the selected biggest empty region by moving memory blocks positioned in a subset of allocated regions that are at boundaries of the selected biggest empty region into other available empty regions.

In another embodiment, an apparatus comprises an operating system stored in a memory, and an integrated circuit card comprising a memory space comprising memory space regions for storing user profile data. The operating system comprises instructions for partitioning the memory space into segments of memory space regions, where the segments of memory space regions comprise allocated regions and empty regions. The operating system further comprises instructions for selecting, from the empty regions, the biggest empty region of the memory space; and widening the selected biggest empty region by moving memory blocks positioned in a subset of allocated regions that are at boundaries of the selected biggest empty region into other available empty regions.

BRIEF DESCRIPTION OF THE DRAWINGS

One or more embodiments will now be described, by way of example only, with reference to the annexed figures, wherein:

FIGS. 1 to 5 describe prior art techniques and have been already described in the foregoing, wherein FIG. 1 shows a possible architecture of a "user equipment" 10, such as a mobile device, e.g. a smartphone or a tablet, or a mobile communication module usually to be used in embedded systems, wherein FIG. 2 shows a SIM card 108 often comprises one or more processors 1082 and one or more memories 1084 for executing applications stored in the memory 1084 of the module 108, wherein FIG. 3 illustrates that a persistent heap PH in the persistent memory 1084 can be generalized as a series of allocated regions and empty regions where each allocated region is composed of a set of blocks, wherein FIGS. 4A and 4B illustrate a persistent heap of a storage memory 1084 of a smart card such as SIM card 108 in two scenarios, wherein FIGS. 6A, 6B, 7A, 7B, 7C are a representation of a principle underlying embodiments, wherein FIG. 6A and FIG. 6B respectively represent a persistent heap PH, similar to the one discussed with reference to FIG. 3, in an initial state or scenario e, and in a state after the application of steps of the method here described, wherein FIGS. 7A, 7B, and 7C shows a situation in which there are blocks of different size in the allocated area, FIGS. 8A1-8A2, 8B, 8C are flow-charts exemplary of embodiments, wherein FIGS. 8A1-8A2 illustrate a flow diagram of an embodiment of the method, wherein FIG. 8B illustrates in detail an upper blocks displacement sub-procedure 152 of FIG. 8A2 and a lower blocks displacement sub-procedure 172 of FIG. 8A2, wherein FIG. 8C illustrates blocks stored in a temporary list M, that holds the skipped block with reference to a big block skipping procedure 200 of FIG. 8A2, and FIG. 9-15 represent implementation of the principles underlying embodiments, wherein FIG. 9 shows an initial state of the heap PH of the memory 1084, wherein FIG. 10 illustrates a subsequent state of the heap after the first iteration, wherein FIG. 11 illustrates a subsequent state of the heap after the next iteration, wherein FIG. 12 illustrates a subsequent state of the heap after resorting to the sub-procedure 200, wherein FIG. 13 illustrates a subsequent state of the heap after the test 150, wherein FIG. 14 illustrates a subsequent state of the heap after completing the defragmentation method, and wherein, wherein FIG. 15 illustrates a subsequent state of the heap after the last step (step 117) of merging the skipped blocks in the list M.

DETAILED DESCRIPTION OF ILLUSTRATIVE EMBODIMENTS

Figure 1:
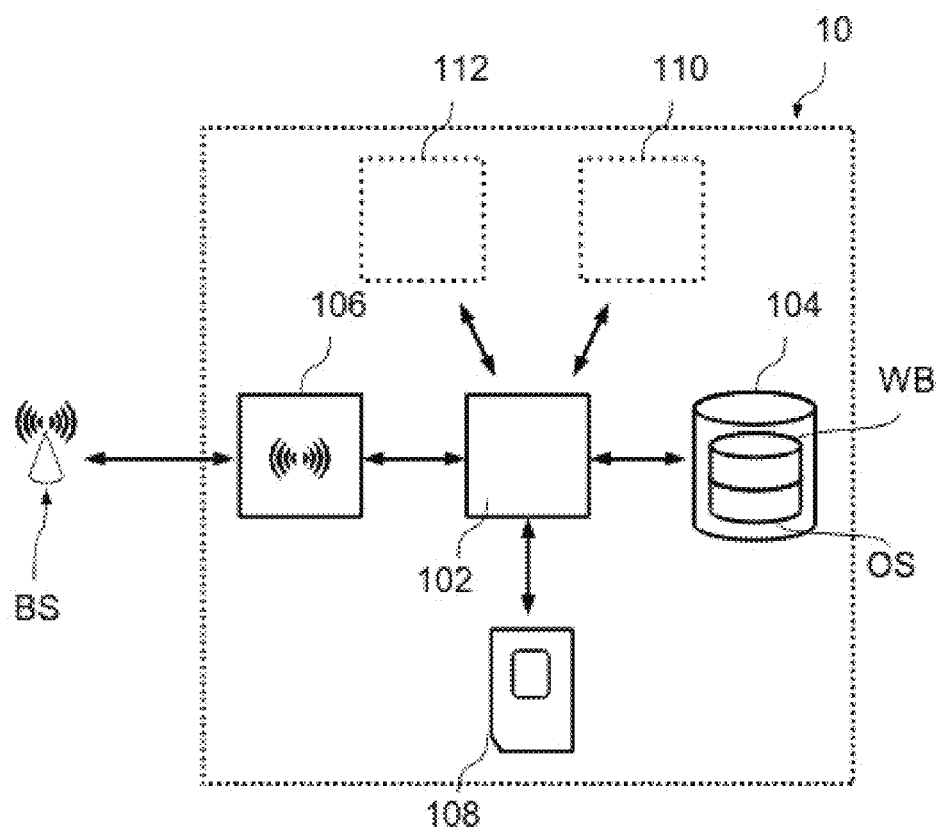
Figure 2:
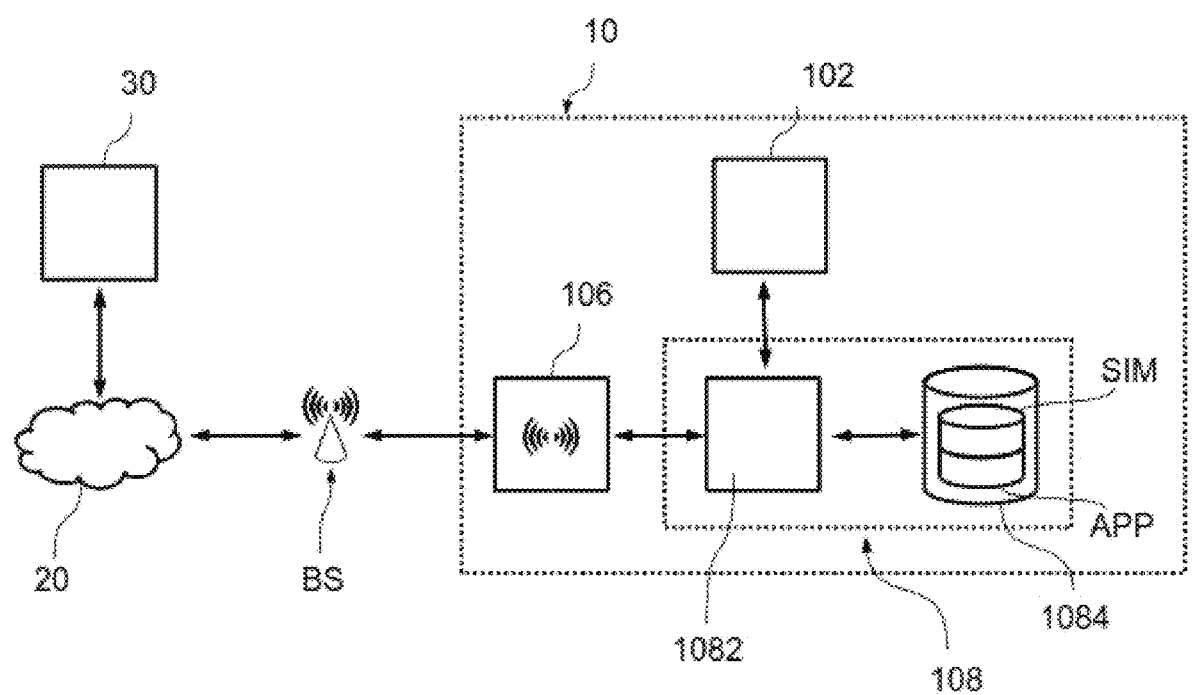
Figures 5A, 5B, 5C:
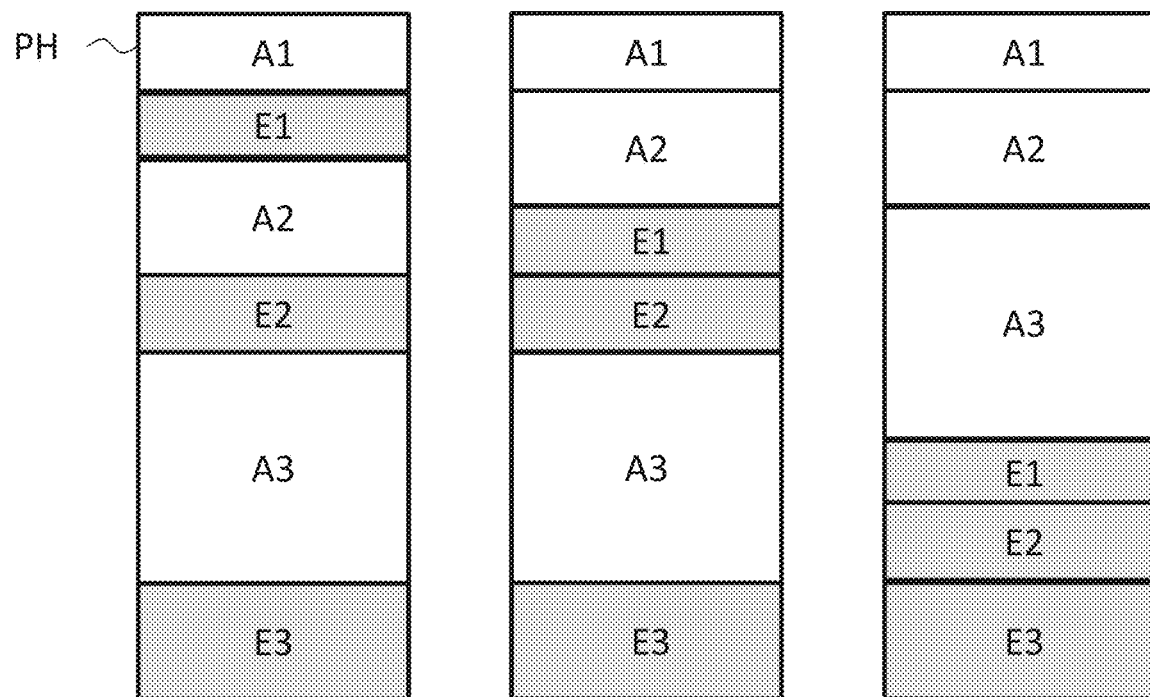
FIGS. 5A, 5B and 5C shows the procedure swapping all the allocated regions with their upper empty region, starting from the second allocated region.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may be applied e.g. to Universal Integrated Circuit Cards (UICC) for use e.g. in mobile communication equipment.

Embodiments described in the present application contribute to dealing with a number of issues which are recognized to exist in a context as discussed in the foregoing.

According to one or more embodiments that object may be achieved by means of a method of managing an integrated circuit card (e.g., an UICC or an eUICC) having the features set forth in the claims that follow.

One or more embodiments may relate to a corresponding integrated circuit card and to corresponding apparatus e.g. equipment for mobile communications.

The claims are an integral part of the technical disclosure of the embodiments as provided herein.

One or more embodiments may provide very fast execution time, and the method is near to execute the minimum number of memory operations to defragment the memory. The algorithm works particularly well when most of the blocks are small. For this reason is well suited for an UICC where the only big blocks are usually the CAP of the packages. The method can be used also in multi-profile UICC where there is some memory constraint to be enforced to guarantee the isolation of the profiles, this being on the other hand very difficult to deal with for a classical defragmentation method. The method can be stopped when a sufficiently low level of fragmentation is reached, e.g. when a block of a certain size (whose allocation was requested) is now allocable. The method described can guarantee "real time" operations even when strict timings are required (e.g. during a profile download). The method described requires a very limited number of transactional operations.

Embodiments of the present application described herein provide a defragmentation procedure, implemented by the smart card operating system in order to "re-compact" empty memory regions. This algorithm or procedure must be as fast as possible to be executed during APDU (Application Protocol Data Unit) processing without significant impact for the end user/system. The bottleneck for a defragmentation procedure is the non-volatile memory operations, so it is possible to roughly estimate the performances of such a procedure by counting the write operations to be performed.

Given a set of indivisible blocks and a set of empty memory regions, one difficulty is finding an efficient procedure that decreases memory fragmentation, i.e. significantly increase the maximum size of an allocable block.

As already indicated in precedence, blocks are the objects by which a security domain, package, applet, file is made of, as they are stored on the non-persistent memory by the operating system. Adjacent blocks can be grouped in allocated region for a matter of clarity in the next figures. Of course the content of the allocated blocks is kept the same at the end of the execution of the defragmentation procedure execution, but their position in memory may vary.

Figures 6A, 6B:
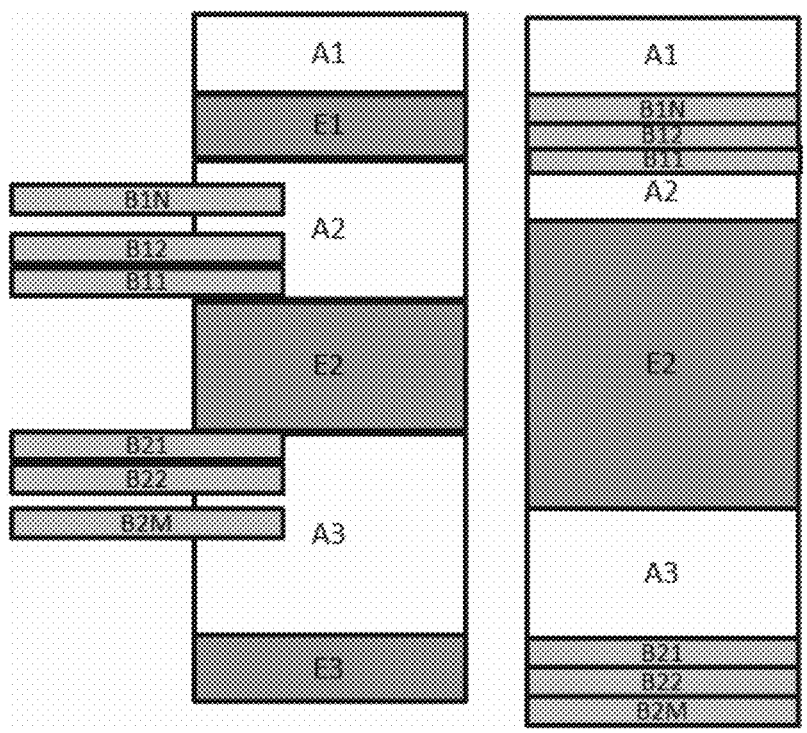

FIG. 6A and FIG. 6B respectively represent a persistent heap PH, similar to the one discussed with reference to FIG. 3, in an initial state or scenario e, and in a state after the application of steps of the method here described. In FIG. 6A, corresponding to the initial state, the allocated region A1 includes blocks B11 . . . B1N, while the allocated region A2 includes blocks B21 . . . B2M.

The defragmentation method here described provides selecting a biggest empty region of the storage memory, i.e. the persistent heap PH. In the example of FIG. 6A which shows a representation of a principle underlying embodiments of the method described here, it is the second empty region E2. The method further includes widening the selected empty partition, or region, by moving blocks at the extremes, or boundaries, of the selected empty partition, i.e. E2, into other available empty partitions, i.e. E1, E3. Therefore the other empty partitions, E1, E3, become knapsacks to be filled with the blocks at the extremes of the biggest empty partition, i.e. blocks B11 . . . B1N, the blocks of the first allocated region A1 adjacent to the upper limit, or boundary, of the second empty region E2, which in FIG. 3B are shown as moved to the first empty region E1, and blocks B21 . . . B2M, the blocks of the third allocated region A3 adjacent to the lower limit of E2, such blocks in FIG. 6B being shown as moved to the empty region E3. The method further includes that the widening operation is performed by filling the smaller empty partitions first. In this way the probability of having blocks too large to be contained into the other empty partitions in both the extremes of the biggest empty partition is minimized. The procedure described operates by subsequent iterations, at each iteration selecting a set of blocks to be moved in the current smallest empty region. This set may be selected from an upper allocated region or from a lower allocated region with respect to said biggest empty region. It depends on which of the two sets of adjacent blocks, upper or lower, is the most convenient one (i.e. which of the two has a size closer to the smallest empty region). In case even the two blocks at the extremes of said biggest partition are both too large to fit the current smallest empty region, another empty region (slightly bigger, for instance the next empty region for size in the set of empty regions of the persistent heap) is selected. The procedure may reach a situation in which at the boundaries of the biggest empty region there are two blocks too large to fit any of the other empty regions. This may happen especially in the final iterations of the procedure, when only small parts of the original partitions of memory are left. The procedure in this case may evaluate that the current fragmentation level of the memory is sufficiently low, and stop its execution, or can simply skip these objects and continue as if they were moved in another empty partition. Such objects will be handled later on. Finally, a classic swap defrag procedure can be additionally executed on the biggest partition area. This defrag aims to compact the objects that have been skipped in the previous phase. There are no timing issues here, since the size of single blocks is negligible.

Figures 7A, 7B, 7C:
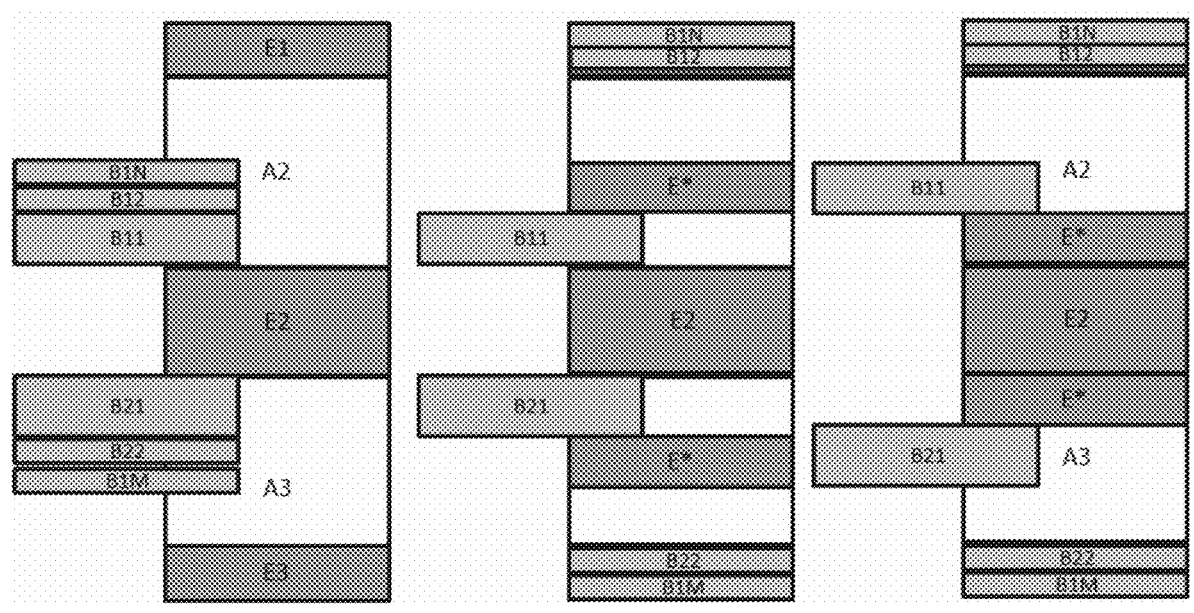

FIGS. 7A, 7B, 7C shows a situation in which there are blocks of different size in the allocated area. Heap PH in FIG. 7A has a selected biggest empty region E2, with an upper adjacent allocated region A2, having upper blocks, B11, B12, . . . B1N, and a lower adjacent allocated region A3, having lower blocks, B21, B22, . . . B1M. Blocks B11 and B21 which are the most adjacent to the selected biggest empty region E2, are also bigger than the other blocks. In FIG. 7B it is shown how the empty regions E2, E3 are filled first with the smaller upper and lower blocks, leaving temporary empty areas E* within the respective allocated regions. Then in FIG. 7C, by a classical defragmentation operation, the bigger blocks B11 and B21 are swapped into the temporary empty areas E*, leaving the selected biggest empty region E2 widened of the size corresponding to such temporary empty areas E*.

Figures 1, 8A:
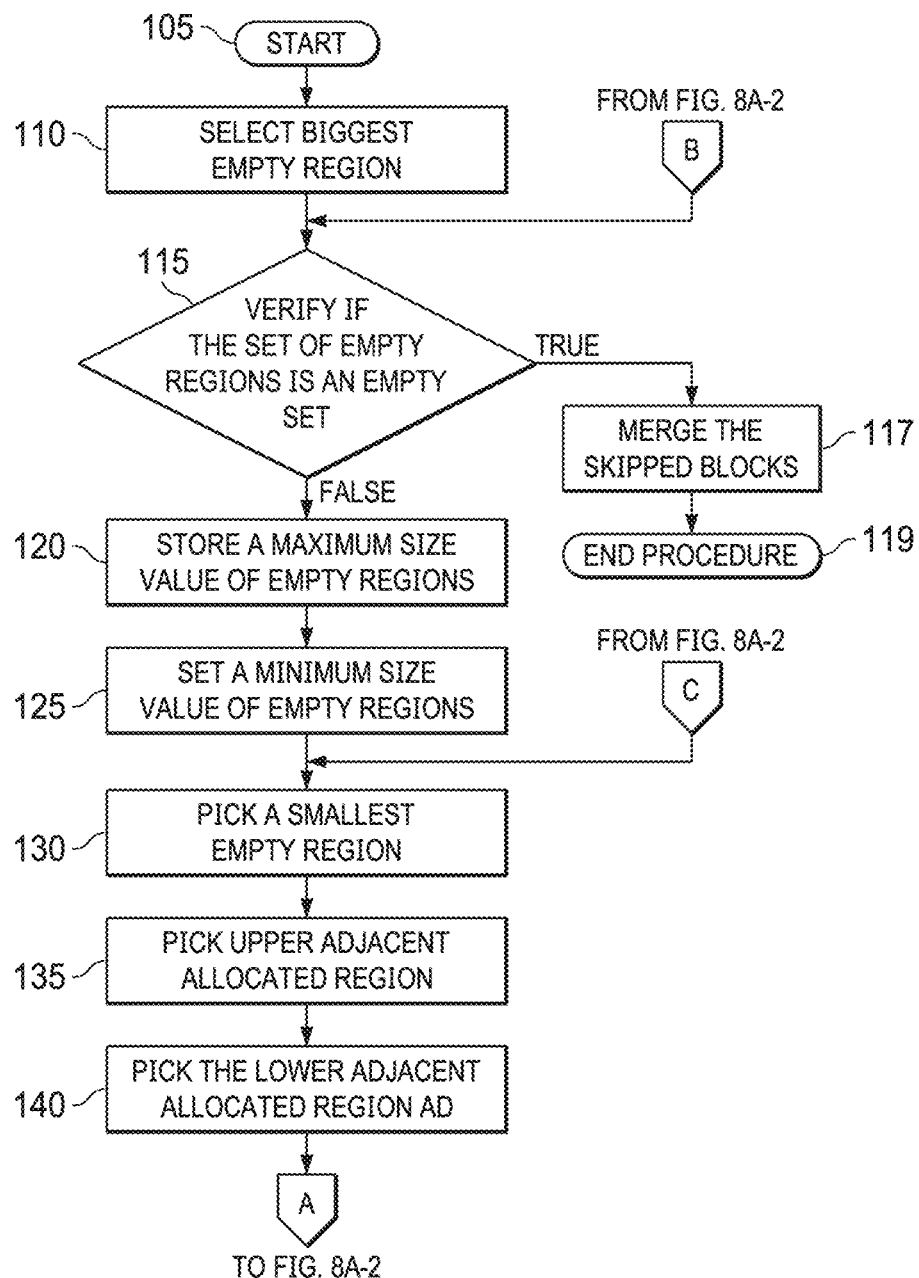
Figures 2, 8A:
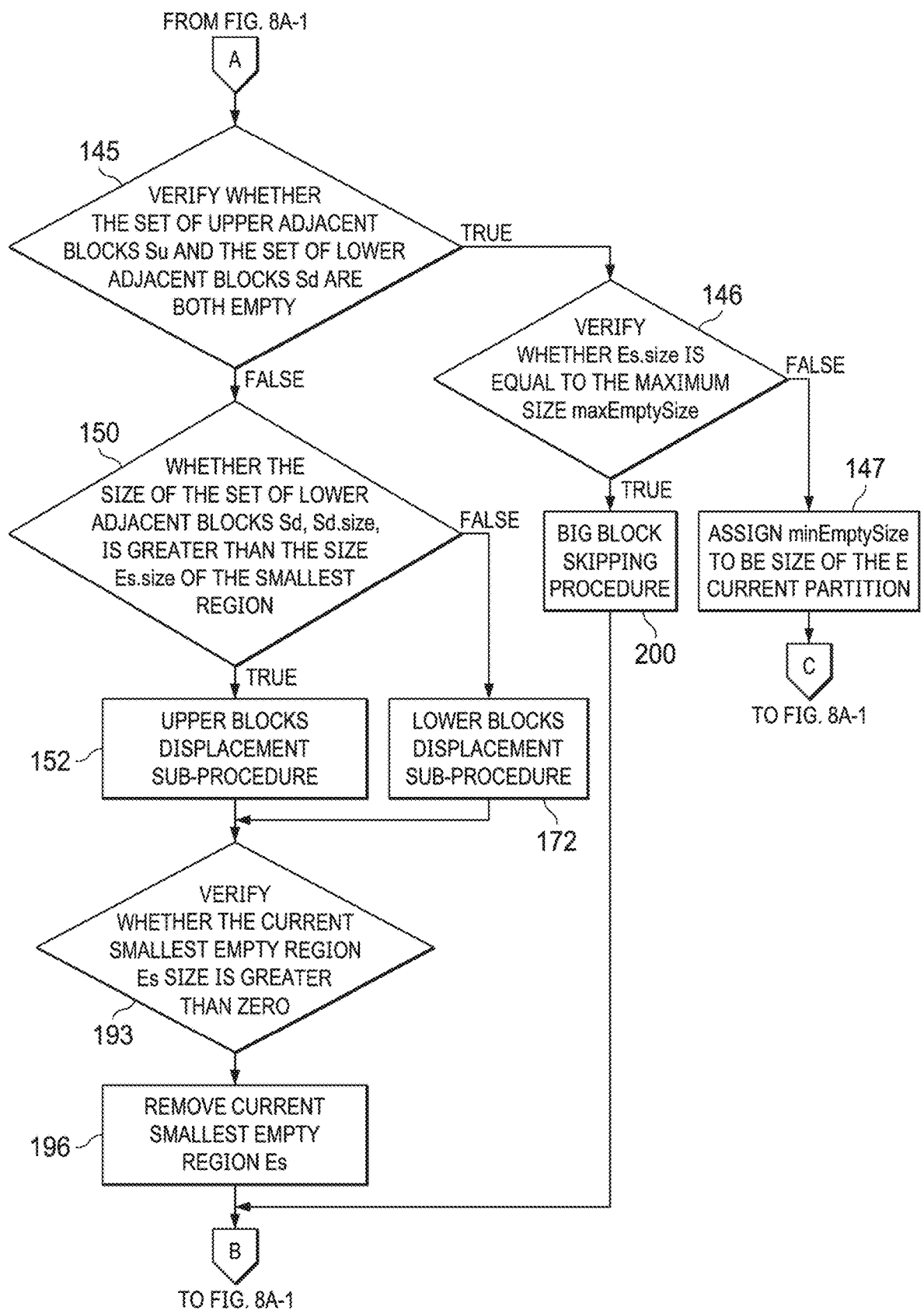

Now, with reference to FIG. 8A, a flow diagram representing an embodiment of the method is described in detail, indicated as whole with the reference 100.

In a start step 105, the set of empty regions E and the set of allocated regions A are received as input.

In a step 110, a biggest empty region Eb is selected and removed from the set of empty regions E which is then taken in consideration by the following steps.

In a test step 115 it is then verified if the set of empty regions E is an empty set. In the negative case, i.e. the test output is FALSE, a step 120 is performed. In the affirmative, i.e. the test output is TRUE, a step 117 is performed, where the blocks stored in a temporary list M, that holds the skipped block and will be better illustrated in the following with reference to a big block skipping procedure 200 and FIG. 8C, are moved to the allocated regions Au, Ad, adjacent to the biggest empty region Eb. Then a step 119 of end procedure is performed.

In a step 120 the size of the biggest empty region in the remaining partitions stored in E (i.e. without considering Eb) is stored as a maximum size value of empty regions, maxEmptySize.

In a step 125 a minimum size value of empty regions, minEmptySize is initially set to zero.

In a step 130 a smallest empty region Es in the set of empty regions E having size bigger than such minimum size minEmptySize is picked.

In a step 135, the upper adjacent allocated region Au is picked, i.e. in upper position with respect to the selected, i.e. biggest, empty region Eb and a set of lower blocks (i.e. blocks down in the region that are directly adjacent to Eb) Su belonging to such upper adjacent allocated region Au is selected so that a size Su.size of the set of upper adjacent blocks Su has the biggest size lower than the size Es.size of the smallest empty region Es.

In a step 140, the lower adjacent allocated region Ad with respect to the chosen, i.e. biggest, empty region Eb is picked and a set of upper blocks (i.e. blocks up in the region that are directly adjacent to Eb) Sd belonging to such lower adjacent allocated region Ad is selected so that the size Sd.size of the set of lower adjacent blocks Sd has the biggest size lower than the size Es.size of the biggest empty region Es.

In a test step 145, it is verified whether the set of upper adjacent blocks Su and the set of lower adjacent blocks Sd are both empty. In case their response is true, it means that the current adjacent allocated regions Au and Ad both have at their extremes at least a block whose size is bigger than Es.size, i.e. it is not possible to fill region Es with the blocks in Au and Ad adjacent to Eb. For this reason, another region, or partition, Es to be filled is chosen. So, in a test step 146 it is verified whether Es.size is equal to the maximum size maxEmptySize. In this case, the current region Es chosen is the biggest empty partition after region Eb. This means that adjacent to the biggest empty region Eb there are (at least) two blocks that are too big to be placed in any of the empty partitions, except Eb. For this reason, these two or more blocks needs to be skipped in a step 205 and the procedure will continue in order to fill the remaining empty partitions.

Otherwise if the overcome of the step 146 is false, in a step 147, minEmptySize is assigned the size Es.size of the current Es partition. For this reason, when the step 130 is executed again, a new region Es bigger than the previous one is picked, and in steps 135, 140 Au and Ad are calculated again with respect to the new region Es.

After one or more iteration of the steps 130, 135, 140, 145, 146, 147, eventually the output test 145 will be FALSE, i.e. any of the set of upper adjacent blocks Su and set of lower adjacent blocks Sd is not an empty set. This means that there is at least a set of blocks adjacent to the biggest empty region Eb that can be moved to Es, thus increasing the size of the empty region, or partition, Eb. Then in a test step 150 it is verified if the difference between the size of the set of upper adjacent blocks Su, Su.size, and the size Es.size, i.e. (Su.size−Es.size), is greater with respect to the difference of the size of the set of lower adjacent blocks Sd, Sd.size, and the size Es.size of the smallest empty region Es, (Sd.size−Es.size). In other word said selection 150 depends on the evaluation of which of said two allocated regions Au, Ad includes a respective set Su, Sd of adjacent blocks having a size Su.size, Sd.size closer to the size of the current smallest empty region Es. Specifically the algorithm chooses the set of blocks that is closer to completely fill Es, thus maximizing the increase of the size of Eb.

Figure 8B:
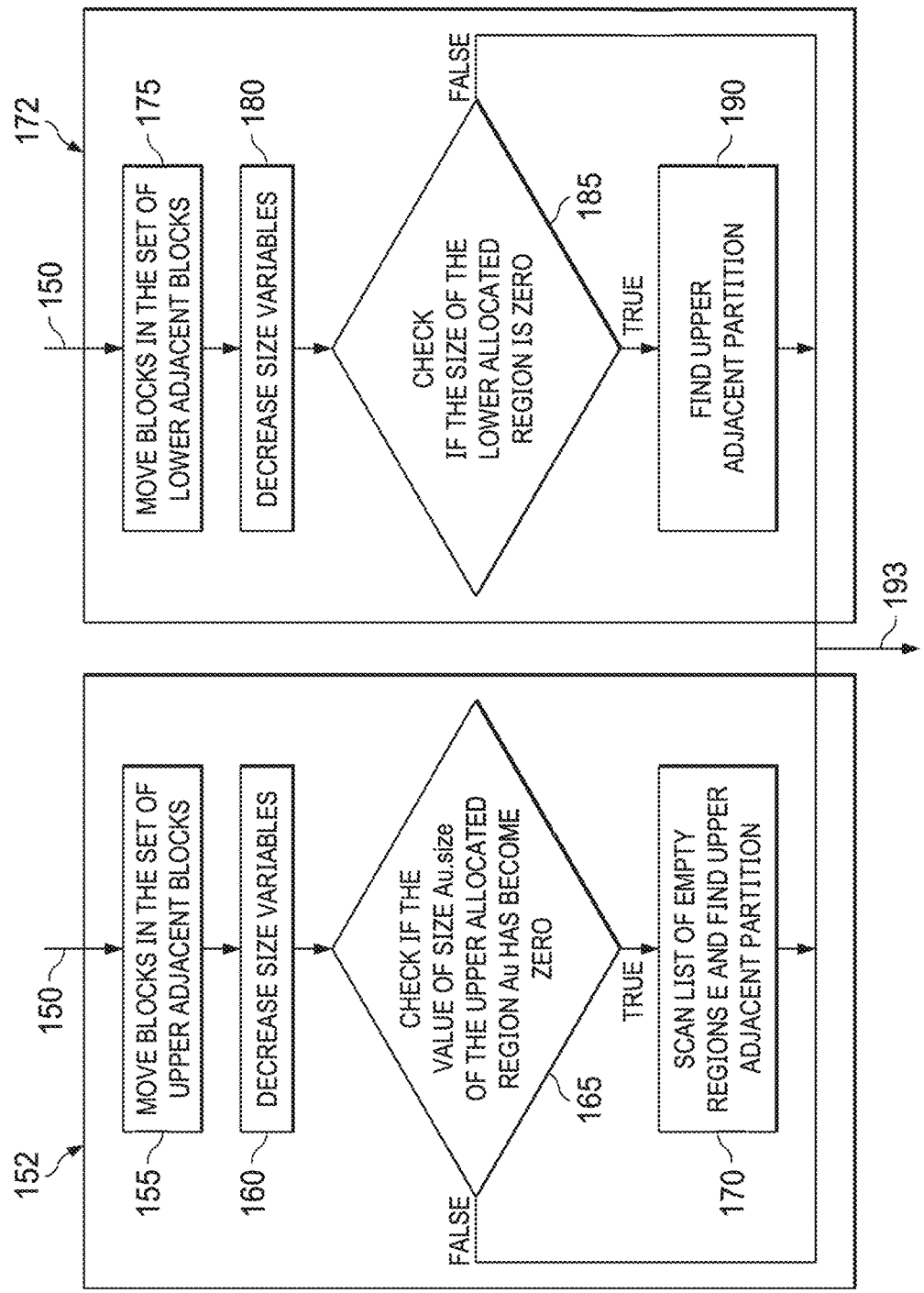
Figure 8C:
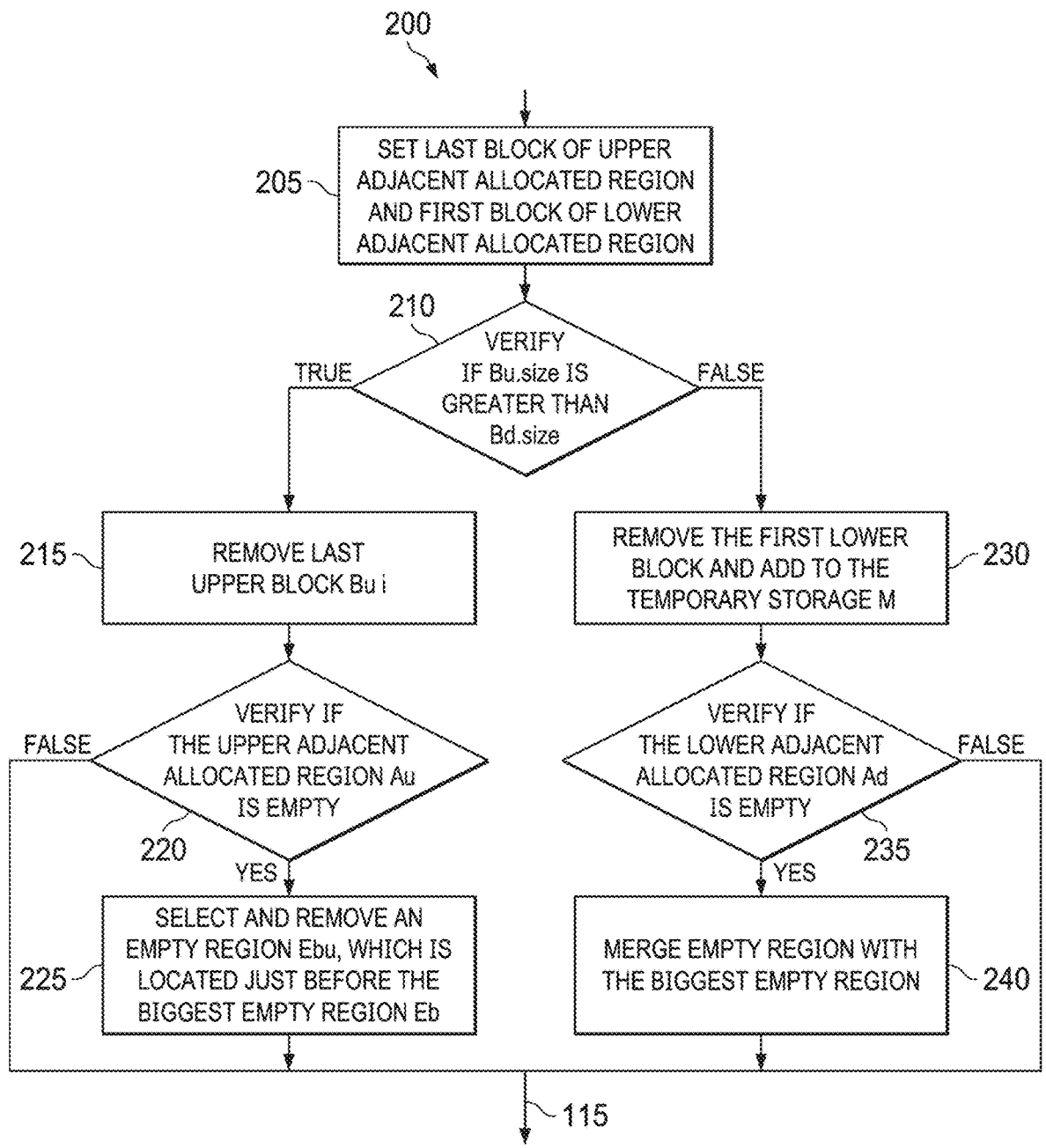

If the difference of the size of the set of upper adjacent blocks Su, Su.size, to the size Es.size of the smallest region Es is the greater, an upper blocks displacement sub-procedure 152, shown in detail in FIG. 8B and starting with step 155 is accessed. Otherwise, a lower blocks displacement sub-procedure 172, also shown in detail in FIG. 8B and starting with step 175, is accessed.

In step 155 the blocks in the set of upper adjacent blocks Su are moved from the upper allocated region Au to one of the two adjacent allocated regions of the smallest empty region Es, indicated as As.

Then in step 160 the variables indicating respectively the size Es.size of the smallest empty region Es, the size Au.size of the allocated region upper adjacent to Eb and the address Eb.addr of the biggest empty partition Eb are decreased of the size Su.Size of the set of upper adjacent blocks Su. Moreover, respectively the variable indicating the size Eb.size of the biggest empty partition and the size As.size of the allocated region adjacent to the smallest empty region Es are increased of the size Su.size of the set of upper adjacent blocks Su as well, i.e.

Es.size=Es.size−Su.size
Au.size=Au.size−Su.size
Eb.addr=Eb.addr−Su.size
Eb.size=Eb.size+Su.size
As.size=As.size+Su.size Depending on which adjacent partition As that the algorithm chose (i.e. upper or lower) the addresses of Es and As are aligned too.

Then in step 165 it is checked if the value of size Au.size of the upper allocated region Au has become zero.

In case the outcome is true, it means that all the blocks in the allocated region Au adjacent to the biggest empty region Eb have been completely moved in one or more iterations of the algorithm, and for this reason the biggest empty region Eb is now adjacent to another empty partition Ebu or to the beginning of the Persistent Heap. So, in a step 170, the list of empty regions E is scanned and the upper adjacent partition Ebu (if any) is found. Ebu is than removed from the list and its size Ebu.size is added to the size of Eb, i.e. Eb.size. Furthermore the address of the biggest empty region Eb is modified to be the address of Ebu, i.e. Eb.addr=Ebu.size.

In case the outcome of the step 165 is false, i.e. Au.size is greater than zero, or after the execution of the step 170, a check is made to verify whether the current smallest empty region Es size is greater than zero in a step 193. In the affirmative case the current smallest empty region Es is removed (step 196) from the set of empty regions E and control returns to the input of step 115 which verifies if the set of empty regions E is an empty set, and then in the step 120 the size of the biggest empty region Eb in the new current empty set E is stored as a maximum size value of empty regions, maxEmptySize.

If test step 150 finds that the difference between the size of the set of lower adjacent blocks Sd, Sd.size, and the size Es.size is the greater, a lower blocks displacement sub-procedure 172 is instead selected, also shown in FIG. 7B and starting with step 175, sub-procedure 172 being dual with respect to the an upper blocks displacement sub-procedure 152 (composed of steps 155, 160, 165, 170), only taking in account that Sd.size is greater than Su.Size.

Therefore, in step 175 the blocks in the set of lower adjacent blocks Sd are moved from the lower allocated region Ad to one of the two adjacent allocated regions of the smallest empty region Es, indicated as regions As.

Then in step 180 the variables indicating respectively the size Es.size of the smallest empty region Es and the size Ad.size of the allocated region lower adjacent to Eb, are decreased of the size Sd.size of the set of upper adjacent blocks Sd. Moreover, respectively the variable indicating the address Ad.addr of the allocated region lower adjacent to Eb, the size Eb.size of the biggest empty partition and the size As.size of the allocated region adjacent to the smallest empty region Es are increased of the size Sd.size of the set of upper adjacent blocks Sd as well, i.e.

Es.size=Es.size−Sd.size
Ad.size=Ad.size−Sd.size
Ad.addr=Ad.addr+Sd.size
Eb.size=Eb.size+Su.size
As.size=As.size+Sd.size Depending on which adjacent partition As the algorithm chose (i.e. upper or lower) the addresses of Es and As are aligned too.

Then in step 185 is checked if the size Ad.size of the lower allocated region Ad is zero.

In case the outcome is true, it means that the allocated region Ad adjacent to the biggest empty region Eb has been completely moved, and for this reason the biggest empty region Eb is now adjacent to another empty partition Ebd or to the end of the Permanent Heap. So, in a step 190, the list of empty regions E is scanned and the upper adjacent partition Ebd (if any) is found. Ebd is than removed from the list and its size Ebd.size is added to the size of Eb, i.e. Eb.size.

In case the outcome of the step 185 is false, i.e. Ad.size is greater than zero, or after the execution of the step 190, it is checked if the size of the smallest empty region Es is greater than zero in the step 193, in the affirmative the smallest empty region Es is removed (step 196) from the set of empty regions E and control returns to the input of step 115 which verifies if the set of empty regions E is now an empty set.

As indicated above, if step 147 is true, i.e. verifying if the size of the empty region Es, i.e. Es.size, is equal to the maximum size of the empty regions, maxEmptySize, this a particular case which requires a sub-procedure, i.e. big block skipping procedure 200, which is shown in FIG. 7C and of which step 205 represents the first step.

The algorithm reaches this case when at the boundaries of the biggest empty region Eb there are (at least) two blocks that are bigger than the biggest empty region (except Eb). This typically happens in the last iterations of the algorithm, when the memory is almost completely defragmented. To handle this case, the algorithm evaluate which is the smallest block at the extremes of the biggest empty region Eb and skips it, i.e. acts as the biggest partitions Eb contains the latter block. Specifically, in step 205, Bu is set as the last block of upper adjacent allocated region Au and Bd as the first block of lower adjacent allocated region Ad. These two blocks are the blocks at the boundaries of the biggest empty region Eb.

Then in a test step 210 is verified if Bu.size is greater than Bd.size.

If Bu.size is lower, then in a step 215 last upper block Bu is removed, i.e. skipped, from the upper adjacent allocated region Au and added to a temporary list M. Furthermore, the size of the biggest region Eb is enlarged of Bu.size and its address becomes Bu.addr.

Then, in a step 220 is verified if the upper adjacent allocated region Au is empty. If this is false control returns to step 115 for a new iteration. If this is true, a step 225 is performed which corresponds to step 170, i.e. an empty region Ebu, which is located just before the biggest empty region Eb, is selected and removed from the set of empty regions E, by merging it with the biggest empty region Eb, which size is then Eb.size is Eb.size+Ebu.size. Furthermore Eb.addr is assigned the value of Ebu.addr. Then controls passes to step 115.

If Bd.size is lower, a dual chain of steps is performed with respect to 215-225, in which in a step 230 the first lower block Bd is removed from the lower adjacent allocated region Ad and added to the temporary storage M. Furthermore, the size of the biggest region Eb is enlarged of Bd.size.

Then in a step 235 is verified if the lower adjacent allocated region Ad is empty. If this is false, control returns to step 115 for a new iteration. If this is true, a step 240 is performed which corresponds to step 190, i.e. an empty region Ebd, which is located just after, or below, Eb, is selected and removed from the set of empty regions E, by merging it with the biggest empty region Eb, which size is then Eb.size is Eb.size+Ebd.size. Then controls passes to step 115 for a new iteration.

It has to be noted that when at steps 115 the set of empty region E is find empty, then the blocks Bu and Bd skipped respectively in step 215 and 230 and stored in the temporary list M are moved in step 117 to the allocated regions Au, Ad, adjacent to the biggest empty region Eb. This operation is made by using a classic swap defrag, where the allocated region are actually blocks (and so usually pretty small). The execution time of this swap procedure, so, is the sum of the execution time needed to move all the blocks skipped to one of the allocated regions adjacent to Eb, and is, for this reason, negligible.

Now an example of the operations of the method 100 described above is given with reference to FIGS. 9-15.

Figure 9:
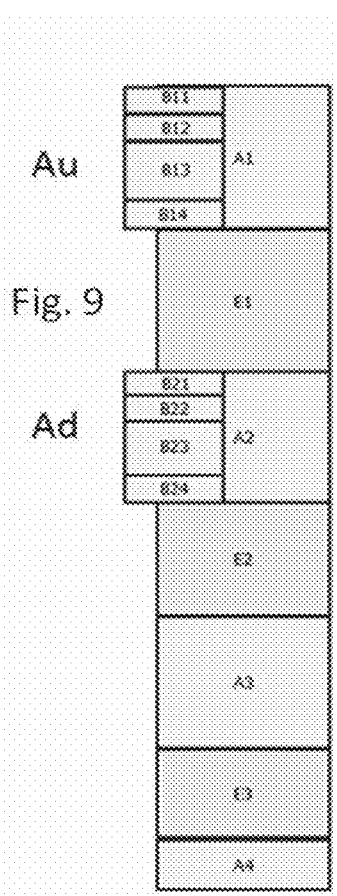

With reference to FIG. 9, it can be seen that in the scenario of the example there shown in the heap PH, E1 is the biggest empty region, while E3 is the smallest region, or partition. FIG. 9 shows a initial state of the heap PH of the memory 1084.

The sizes of the empty and allocated regions of the heap in such initial state of the defragmentation method here described are:

B11.size=1 kB
B12.size=1.5 kB
B13.size=7 kB
B14.size=0.5 kB
B21.size=1 kB

B22.size=2 kB
B23.size=6 kB
B24.size=0.5 kB
E1.size=10 kB
E2.size=6 kB
E3.size=4 kB The method, as described, is configured to find the biggest empty region Eb, i.e. E1, and the smallest empty region Es, E3, for instance by steps 105-130 of the embodiment of FIG. 7A, then operates to widen the biggest empty region E1.

Figure 10:
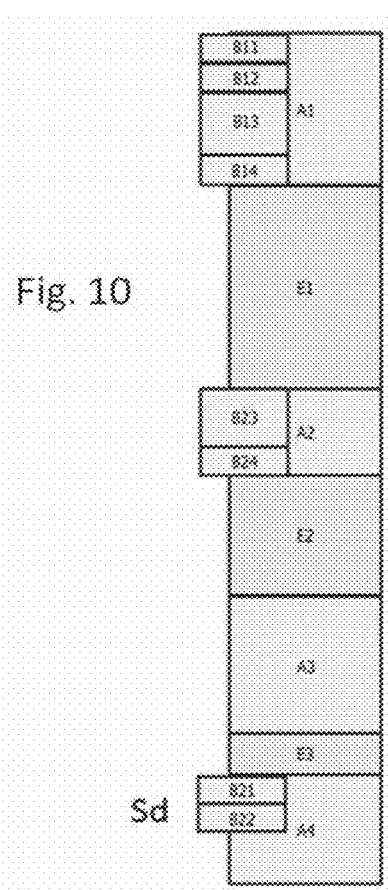

In particular, the method provides in a first iteration (which as shown, begins, after selecting the biggest region Eb in step 110 with test 115, checking if there are empty regions in the heap), which result is shown in FIG. 10, to evaluate the upper adjacent allocated region Au and the lower adjacent allocated region Ad of the biggest empty region E1 (for instance by steps 135-150 of the embodiment of FIG. 7A). To fill the smallest empty region E3, from the upper region Au the best set of upper adjacent blocks Su (evaluated for instance through step 135) is Su={B14} of size 0.5 KB, since adding also block B13 would result in a size (7.5 KB) bigger than the smallest region E3. The algorithm, then, analyzes the adjacent blocks from the lower region Ad, (for instance through step 140), and selects as set of lower adjacent blocks Sd, Sd={B21, B22} of size 3 KB. Since the size Sd.size of 3 KB is closer than 0.5 KB, Su.size, to E3.size (this condition in the embodiment of FIG. 7A being evaluated in step 150), the blocks in the set of lower adjacent blocks Sd are moved (step 175) to the smallest empty region E3 in the most far position with respect to E1 (in the example). Thus, the size of the biggest empty region E1 will increase of 3 KB, while the size of the smallest empty region E3 will decrease of the same amount (step 180).

After these steps, the sizes reached by the defragmentation method and described in FIG. 10 are:
B11.size=1 kB
B12.size=1.5 kB
B13.size=7 kB
B14.size=0.5 kB
B21.size=1 kB
B22.size=2 kB
B23.size=6 kB
B24.size=0.5 kB
E1.size=13 kB
E2.size=6 kB
E3.size=1 kB From the chain of steps 175-190, the control returns to step 115, which starts a new iteration. Every time a new iteration starts, it is evaluated whether the empty region set E is empty, and in this case (test 115 true) the algorithm ends moving the skipped blocks to the closest allocated regions near the biggest empty partition.

It has to be noted that blocks B21 and B22 are now in the allocated region A4, but are not shown for simplicity since they are not anymore relevant for the defragmentation procedure.

Again the region E3 is the smallest empty partition available. Sd={ } since B23.size (6 KB) is bigger than E3.size (1 KB). Su={B14} of size 0.5 KB.

The method then chooses (test 150) to move the blocks in Su in the empty region E3. Thus E3.size will decrease of 0.5 KB and E1.size will increase of the same amount (chain of steps 155-170).

Figure 11:
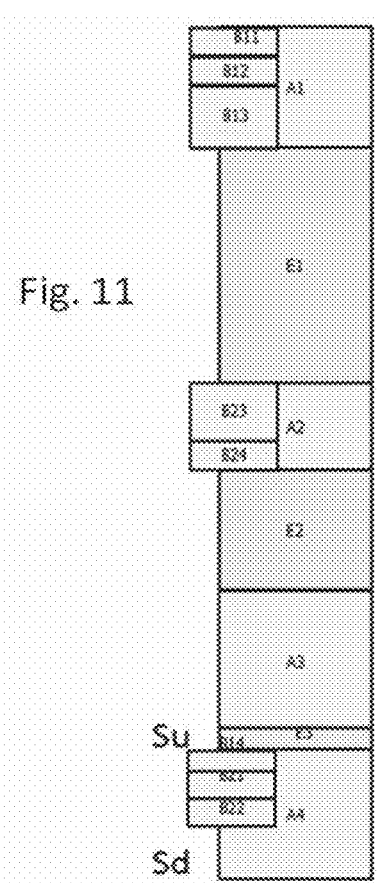

Thus, the sizes reached by the defragmentation method and described in FIG. 11 are:
B11.size=1 kB
B12.size=1.5 kB
B13.size=7 kB
B14.size=0.5 kB
B21.size=1 kB
B22.size=2 kB
B23.size=6.5 kB
B24.size=0.5 kB
E1.size=13.5 kB
E2.size=6 kB
E3.size=0.5 kB In the configuration of FIG. 11, E3 is the smallest partition. However upper set Su={ } and lower set Sd={ }, i.e. are empty (test 145 is verified) since both B13.size and B23.size are bigger than E3.size. The method therefore picks (step 146) the next empty region in size (E2) and tries to fill it (return to step 115).

However, also in this case both sets Su and Sd are { }, i.e. empty, since both B13.size and B23.size are bigger than E2.size.

Since in this example there are no other partitions (i.e. step 146 is true), the method needs to skip one of the two big blocks (B13 or B23). In the embodiment of FIG. 7 this means resorting to sub-procedure 200 (FIG. 7C).

Since B23.size is lower than B13.size (step 210), B23 is skipped (it will be moved later to an adjacent allocated region).

The sizes reached by the defragmentation method and described in FIG. 12 are:
B11.size=1 kB
B12.size=1.5 kB
B13.size=7 kB
B14.size=0.5 kB
B21.size=1 kB
B22.size=2 kB
B23.size=6.5 kB
B24.size=0.5 kB
E1.size=20 kB
E2.size=6 kB
E3.size=0.5 kB It is to be noted that region E1 is for simplicity shown larger, to show that the procedure now has at its extremes, i.e. upper and lower boundaries, blocks B13 and B24.

The smaller partition Es is again E3. Set Su={ } while Sd={B24} of size 0.5 KB.

The method (test 150) chooses the lower adjacent set Sd and moves its blocks to E3 filling it completely.

The sizes reached by the defragmentation method and described in FIG. 13 are:
B11.size=1 kb
B12.size=1.5 kB
B13.size=7 kB
B14.size=0.5 kB
B21.size=1 kB
B22.size=2 kB
B23.size=6.5 kB
B24.size=0.5 kB
E1.size=20.5 kB
E2.size=6 kB In FIG. 13, it has to be noted that that the empty region E1 can be merged with empty region E2 (Ebd in step 185), since there are no longer allocated regions separating them, and, in the same way, allocated region A3 can be merged with allocated region A4. Regions are merged and only one partition remains. This means that the defragmentation process is complete.

The sizes reached by the defragmentation method and described in FIG. 14 are:
B11.size=1 kB
B12.size=1.5 kB
B13.size=7 kB
B14.size=0.5 kB
B21.size=1 kB
B22.size=2 kB
B23.size=6.5 kB
B24.size=0.5 kB
E1.size=26.5 kB The method as last step (step 117) only needs to merge the skipped blocks in the list M={B23} to an adjacent allocated region.

The result of this is shown in FIG. 15, where block B23 appears moved to the adjacent A1 allocated region, and the defragmentation procedure is now completed, since only one empty region exists in memory.

The sizes in the state reached by the defragmentation method described in FIG. 15 still are:
B11.size=1 kb
B12.size=1.5 kb
B13.size=7 kB
B14.size=0.5 kB
B21.size=1 kB
B22.size=2 kB
B23.size=6.5 kB
B24.size=0.5 kB
E1.size=26.5 kB In this example big block sizes are used for simplicity. However usually in an UICC or in eUICC typical block sizes are much lower. In fact, the memory map of a UICC/eUICC on the field is usually much different, with thousands of blocks and only a few of them with a significant size. This results in increased performances of the algorithm, since in very few cases it will be needed to skip a block.

A method according to one or more embodiments may thus include providing an integrated circuit card 10 with a memory space PH including memory space regions for storing user profile data A; and partitioning said memory space PH in segments A1, A2, . . . , E1, E2, . . . of memory space regions comprising empty regions A1, A2, . . . and allocated regions E2, E2, . . . . The method further includes selecting 110 among said empty regions E1, E2, . . . the biggest empty region Eb of said memory space PH, and widening said selected biggest empty region Eb by moving memory blocks positioned in allocated regions Au, Ad at the bounds of said selected biggest empty region Eb into other available empty regions Es.

One or more embodiments may include that said operation of widening said selected biggest empty region Eb includes performing one or more iterations of a defragmentation procedure 100. At each iteration, the method includes initially selecting 130 a current smallest empty partition Es in said empty regions E1, E2, . . . in said memory space PH; and selecting 150 a set of blocks to be moved in the current smallest empty region Es from an upper allocated region Au allocated at the upper bound of said biggest empty region Eb or from a lower allocated region Ad allocated at the upper bound of said biggest empty region Eb, said selection 150 depending on which of said two allocated regions Au, Ad includes a respective set Su, Sd of adjacent blocks having a size Su.size, Sd.size closer to the size of said smallest empty region Es.

In one or more embodiments in case said upper and lower allocated region Au, Ad include sets Su, Sd of adjacent blocks which are both too large to fit the current smallest empty region Es, a bigger empty region Ej with respect to said current smallest empty region Es, in particular the next bigger region Ej, is selected as the current smallest empty region Es.

In one or more embodiments if the allocated regions at the boundaries of the biggest empty region Eb comprise blocks adjacent to said boundaries too large to fit any of the other empty regions E1, E2, . . . it is provided to evaluate if a current fragmentation level of the memory is sufficiently low, and stop execution, or to skip by the big block skipping procedure 200 said blocks too large to fit and perform a new iteration.

One or more embodiments may include executing a final swap defragmentation procedure on the biggest partition area Eb, in particular swapping all the allocated regions starting from the second allocated region at the lower bound of the biggest partition area Eb, with their upper empty region.

An integrated circuit card e.g. a UICC or eUICC according to one or more embodiments may include a memory space PH including memory space regions for storing data. One or more processors 102 are configured to partition said memory space PH in segments A1, A2, . . . , E1, E2, . . . of memory space regions comprising empty regions A1, A2, . . . and allocated regions E2, E2, . . . . The card is configured to select 110 among said empty regions E1, E2, . . . the biggest empty region Eb of said memory space PH, and widen said selected biggest empty region Eb by moving memory blocks positioned in allocated regions Au, Ad at the bounds of said selected biggest empty region Eb into other available empty regions Es.

In one or more embodiments for use according to a profile stored in an integrated circuit card 108 may include an integrated circuit card 108 according to one or more embodiments.

One or more embodiments may include an operating system configured for managing the integrated circuit card 108 with the method of one or more embodiments.

An apparatus according to one or more embodiments may include a mobile communications apparatus such as an user equipment.

Without prejudice to the underlying principles, the details and embodiments may vary, even significantly, with respect to what has been described by way of example only, without departing from the extent of protection.

What is claimed is:

1. A method of managing an integrated circuit memory, the method comprising:
having an integrated circuit card with a memory space including memory space regions for storing user profile data;
partitioning the memory space into segments of memory space regions, the segments of memory space regions comprising allocated regions and empty regions;
selecting, from the empty regions, the biggest empty region of the memory space, the biggest empty region comprising an upper boundary and a lower boundary;
after selecting the biggest empty region, selecting a subset of allocated regions comprising
an upper subset of memory blocks in an upper allocated region immediately adjacent to the upper boundary, and a lower subset of memory blocks in a lower allocated region immediately adjacent to the lower boundary; and widening the selected biggest empty region by moving memory blocks of the subset of allocated regions into other available empty regions.

2. The method of claim 1, wherein, in response to determining that the subset of allocated regions comprises a memory block that is larger in size than any of the empty regions other than the biggest empty region,
evaluating if a current fragmentation level of the memory is sufficiently low, and stopping the partitioning, the selecting, and the widening, or
skipping the memory block that is larger in size in the subset of allocated regions, and performing the widening.

3. The method of claim 1, wherein the widening comprises:
selecting a current smallest empty region from the empty regions in the memory space; and
selecting a set of memory blocks to be moved into the current smallest empty region from the upper subset of memory blocks or from the lower subset of memory blocks.

4. The method of claim 3, wherein selecting a current smallest empty region comprises:
determining the smallest empty region of the empty regions; and
in response to determining that the upper and the lower allocated regions both comprise adjacent blocks that are larger than the smallest empty region, selecting another empty region from the empty regions as the current smallest empty region so that the another empty region is bigger than the smallest empty region.

5. The method of claim 4, wherein the another empty region is smaller than all the remaining ones of the empty regions other than the smallest empty region.

6. The method of claim 3, wherein selecting the set of memory blocks to be moved comprises:
determining a first size of the current smallest empty region;
determining a second size of the upper subset of memory blocks from the upper allocated region and a third size of the lower subset of memory blocks from the lower allocated region;
determining whether the second size or the third size is closer in size to the first size;
selecting the upper subset of memory blocks from the upper allocated region in response to determining that the second size is closer in size to the first size than the third size; and
selecting the lower subset of memory blocks from the lower allocated region in response to determining that the third size is closer in size to the first size than the second size.

7. The method of claim 6, wherein in response to determining that the second size and the third size are both larger than the first size, selecting another empty region that is bigger than the current smallest empty region.

8. The method of claim 7, wherein the another empty region is smaller than all the remaining ones of the empty regions other than the smallest empty region having the first size.

9. The method of claim 3, wherein the widening further comprises iterating the steps of:
selecting a current smallest empty region and selecting a set of blocks to be moved.

10. The method of claim 1, further comprising:
executing a final swap defragmentation procedure on a partition that has the biggest partition area.

11. The method of claim 1, further comprising: swapping all the allocated regions starting from a second allocated region at the lower bound of a partition that has the biggest partition area, with their upper empty region.

12. The method of claim 1, wherein the user profile data comprise applications, security domains and files, supplied by a mobile network operator to which a mobile terminal associated to the card is subscripting.

13. An integrated circuit card including:
a processor;
a program to be executed in the processor stored in a memory;
a memory space comprising memory space regions for storing user profile data, the program comprising instructions for:
partitioning the memory space into segments of memory space regions, the segments of memory space regions comprising allocated regions and empty regions;
selecting, from the empty regions, the biggest empty region of the memory space, the biggest empty region comprising an upper boundary and a lower boundary;
after selecting the biggest empty region, selecting a subset of allocated regions comprising
an upper subset of memory blocks in an upper allocated region immediately adjacent to the upper boundary, and
a lower subset of memory blocks in a lower allocated region immediately adjacent to the lower boundary; and
widening the selected biggest empty region by moving memory blocks of the subset of allocated regions into other available empty regions.

14. The integrated circuit card of claim 13, wherein the program comprises further instructions for:
in response to determining that the subset of allocated regions comprises a memory block that is larger in size than any of the empty regions other than the biggest empty region,
evaluating if a current fragmentation level of the memory is sufficiently low, and stopping the partitioning, the selecting, and the widening, or
skipping the memory block that is larger in size in the subset of allocated regions, and performing the widening.

15. The integrated circuit card of claim 13, wherein the instructions for widening comprises:
selecting a current smallest empty region from the empty regions in the memory space; and
selecting a set of memory blocks to be moved into the current smallest empty region from the upper subset of memory blocks or from the lower subset of memory blocks.

16. The integrated circuit card of claim 15, wherein the instructions for selecting the current smallest empty region comprises:
determining the smallest empty region of the empty regions; and
in response to determining that the upper and the lower allocated regions both comprise adjacent blocks that are larger than the smallest empty region, selecting another empty region from the empty regions as the current smallest empty region so that the another empty region is bigger than the smallest empty region.

17. The integrated circuit card of claim 16, wherein the another empty region is smaller than all the remaining ones of the empty regions other than the smallest empty region.

18. The integrated circuit card of claim 15, wherein the instructions for selecting the set of memory blocks to be moved comprises:
   determining a first size of the current smallest empty region;
   determining a second size of the upper subset of memory blocks from the upper allocated region and a third size of the lower subset of memory blocks from the lower allocated region;
   determining whether the second size or the third size is closer in size to the first size;
   selecting the upper subset of memory blocks from the upper allocated region in response to determining that the second size is closer in size to the first size than the third size; and
   selecting the lower subset of memory blocks from the lower allocated region in response to determining that the third size is closer in size to the first size than the second size.

19. An apparatus comprising:
an operating system stored in a memory; and
an integrated circuit card comprising a memory space comprising memory space regions for storing user profile data, wherein the operating system comprises instructions for:
   partitioning the memory space into segments of memory space regions, the segments of memory space regions comprising allocated regions and empty regions;
   selecting, from the empty regions, the biggest empty region of the memory space, the biggest empty region comprising an upper boundary and a lower boundary;
   after selecting the biggest empty region, selecting a subset of allocated regions comprising
      an upper subset of memory blocks in an upper allocated region immediately adjacent to the upper boundary, and
      a lower subset of memory blocks in a lower allocated region immediately adjacent to the lower boundary; and
   widening the selected biggest empty region by moving memory blocks of the subset of allocated regions into other available empty regions.

20. The apparatus according to claim 19, wherein the apparatus comprises a mobile communications apparatus.

21. The apparatus according to claim 19, wherein the apparatus is configured to use a profile from the user profile data stored in the integrated circuit card.

22. A method of managing an integrated circuit memory, the method comprising:
   having an integrated circuit card with a memory space including memory space regions for storing user profile data;
   partitioning the memory space into segments of memory space regions, the segments of memory space regions comprising a set of allocated regions and a set of empty regions;
   selecting, from the set of empty regions, the biggest empty region of the memory space;
   after selecting the biggest empty region, selecting a first allocated region immediately adjacent to a first boundary of the biggest empty region and comprising a first plurality of memory blocks;
   after selecting the biggest empty region, selecting a second allocated region immediately adjacent to a second boundary of the biggest empty region and comprising a second plurality of memory blocks; and
   widening the selected biggest empty region by
      moving a subset of the first plurality of memory blocks from the first allocated region into a first empty region from the set of empty regions, and
      moving a subset of the second plurality of memory blocks from the second allocated region into a second empty region from the set of empty regions.

23. The method of claim 22, wherein the first empty region is the smallest empty region from the set of empty regions.

24. The method of claim 22, further comprising:
in response to determining that a first memory block in the first allocated region immediately adjoining the biggest empty region is larger than the smallest empty region from the set of empty regions, selecting a second memory block adjacent the first memory block from the first allocated region to be in the subset of the first plurality of memory blocks.

25. The method of claim 22, further comprising:
in response to determining that a first memory block in the first allocated region immediately adjoining the biggest empty region is larger than the smallest empty region from the set of empty regions, selecting the first empty region to be bigger than the smallest empty region.

26. The method of claim 25, wherein the first empty region is smaller than all the remaining ones of the empty regions other than the smallest empty region.

* * * * *